United States Patent
Higuchi et al.

(10) Patent No.: US 9,109,627 B2
(45) Date of Patent: Aug. 18, 2015

(54) SLIDING DEVICE INCLUDING SLIDING BEARING

(75) Inventors: Tsuyoshi Higuchi, Yokohama (JP);
Yutaka Mabuchi, Yokohama (JP);
Benjamin Duffau, Voisins-le-Bretonneux (FR); Alain Pasgrimaud, Marly le Roi (FR);
Carmelo Gugliotta, Chatillon (FR)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 572 days.

(21) Appl. No.: 12/809,866

(22) PCT Filed: Dec. 28, 2007

(86) PCT No.: PCT/JP2007/001491
§ 371 (c)(1),
(2), (4) Date: Jun. 21, 2010

(87) PCT Pub. No.: WO2009/084072
PCT Pub. Date: Jul. 9, 2009

(65) Prior Publication Data
US 2010/0266227 A1    Oct. 21, 2010

(51) Int. Cl.
*F16C 9/02* (2006.01)
*F16C 33/10* (2006.01)

(52) U.S. Cl.
CPC .. *F16C 33/10* (2013.01); *F16C 9/02* (2013.01)

(58) Field of Classification Search
USPC .................................. 384/129, 275, 276, 280
See application file for complete search history.

(56) References Cited

U.S. PATENT DOCUMENTS

| | | | |
|---|---|---|---|
| 6,095,690 A | 8/2000 | Niegel et al. | |
| 6,739,238 B2* | 5/2004 | Ushijima et al. | 92/158 |
| 6,802,650 B2 | 10/2004 | Yasuda et al. | |
| 6,886,521 B2 | 5/2005 | Hamada et al. | |
| 7,284,525 B2* | 10/2007 | Nishimura et al. | 123/193.6 |
| 2003/0162672 A1 | 8/2003 | Shirahama et al. | |
| 2004/0074467 A1 | 4/2004 | Hamada et al. | |
| 2005/0049716 A1 | 3/2005 | Wagener et al. | |
| 2005/0056241 A1 | 3/2005 | Nomura et al. | |
| 2005/0100701 A1* | 5/2005 | Hamada et al. | 428/36.91 |
| 2006/0000095 A1* | 1/2006 | Betsch et al. | 29/898.12 |
| 2009/0252447 A1* | 10/2009 | Hirai et al. | 384/513 |

FOREIGN PATENT DOCUMENTS

| | | |
|---|---|---|
| CN | 1580502 A | 2/2005 |
| DE | 101 57 316 A1 | 6/2003 |
| EP | 1 338 641 A1 | 8/2003 |
| EP | 1 630 396 A2 | 3/2006 |

(Continued)

OTHER PUBLICATIONS

Machine Translation of JP 2004-162895 A.*

(Continued)

*Primary Examiner* — Thomas Diaz
(74) *Attorney, Agent, or Firm* — Foley & Lardner LLP

(57) ABSTRACT

A sliding device includes a sliding bearing, and a shaft which is rotatable and in slidable contact with the sliding bearing in presence of a lubricating oil. The sliding bearing has a surface hardness smaller than a surface hardness of the shaft. Additionally, the sliding bearing has a surface roughness Ra of not larger than 0.2 micrometer, and the shaft has a surface roughness of not larger than 0.05 micrometer.

20 Claims, 2 Drawing Sheets

(56) References Cited

FOREIGN PATENT DOCUMENTS

| | | |
|---|---|---|
| JP | 2000-504089 A | 4/2000 |
| JP | 2000-283143 A | 10/2000 |
| JP | 2001-289169 A | 10/2001 |
| JP | 2003-184883 A | 7/2003 |
| JP | 2004-028276 A | 1/2004 |
| JP | 2004-138128 A | 5/2004 |
| JP | 2004-162895 A | 6/2004 |
| JP | 2006-17218 A | 1/2006 |
| JP | 2006-82163 A | 3/2006 |
| JP | 2006-144100 A | 6/2006 |
| JP | 2006-220281 A | 8/2006 |
| JP | 2006-257916 A | 9/2006 |
| WO | WO 2005117006 A2 * | 12/2005 |

OTHER PUBLICATIONS

JIS B 0601, "Surface roughness—Definitions and designation", Japanese Industrial Standard, 1994, 26 pages.

Japanese Office Action dated Nov. 12, 2013, (4 pgs.).

* cited by examiner

SLIDING DEVICE INCLUDING SLIDING BEARING

TECHNICAL FIELD

This invention relates to a sliding device in which a shaft is in slidable contact with a bearing in the presence of lubricating oil.

BACKGROUND ART

A sliding device has been frequently used under high load and durability-requiring circumstances, such as a condition where a crankshaft of an automotive reciprocating engine is operated. Since it is possible to improve the work efficiency of the whole sliding device by reducing a sliding resistance, a variety of efforts has been hitherto made for the purpose of improving the work efficiency. In the sliding device where sliding is made in the presence of a lubricating oil, a measure for reducing the sliding resistance is to minimize a surface roughness, which has been presently continuously carried out. Recently, it has been possible to machine a surface so as to obtain a very small surface roughness under development of machining techniques.

For example, for the purpose of reducing a frictional force and improving a wear resistance, it has been proposed to minimize an average roughness along with change in surface film and material, as disclosed in Japanese Patent Provisional Publication No. 2004-28276 and 2004-138128. In the Publication No. 2004-138128, the surface roughness Ra is proposed to be not larger than 0.03 micrometer.

In a sliding device where sliding is made in high load circumstances, the material and hardness of one sliding surface are different from those of an opposite sliding surface from the viewpoint of obtaining a seizure resistance, in which it is found that the surface roughness of the sliding surface having a smaller hardness than the opposite sliding surface is larger than that of the opposite surface.

For example, in a crankshaft of an automotive reciprocating engine, a shaft is made of a carbon steel and machined to have a surface roughness Ra of 0.1 to 0.03 micrometer, while a bushing has a bushing metal made from metal such as bismuth, tin, silver, lead, nickel and/or like, alloy made from aluminum, tin, lead, copper and/or nickel, or polymer, the bushing metal having a relatively large initial surface roughness Ra of about 0.3 to 0.4 micrometer. In another hand, the choice of Ra has been used rather than Rq because of its larger use in the industry. In this case, adaptation of the bushing metal progresses during operation of the bushing metal, so that flattening of the bushing metal is made to a certain extent. In many cases, an effort to minimize the surface roughness of the shaft is made to reduce a frictional resistance; however, a consideration has hardly been made on the surface roughness of the side of the bushing. In spite of such a situation, a certain sliding resistance lowering effect has been able to be obtained. This is assumed to result from the fact that adaptation or running-in (meaning that the surface roughness of a contacting section becomes small owing to an initial sliding) of the above-mentioned bushing metal having a smaller hardness progresses even if the roughness of the bushing metal is larger.

DISCLOSURE OF INVENTION

In view of the above situation, the present inventors have conducted detailed investigations on the relationship between the surface roughness of a shaft and the friction torque of a sliding device, for many sliding devices each of which includes a combination of a relatively hard material of the shaft and a relatively soft material of the sliding bushing. As a result of the investigations, it has been found that the friction torque cannot be lowered and rather be raised even if the surface roughness of the shaft is decreased to obtain a smoother surface, in case that the surface roughness of the shaft is sufficiently minimized. This is depicted in FIG. 1 showing the relationship between the surface roughness of the shaft and the friction torque measured.

Then, the present inventors have conducted further investigations on the above evaluation results. As a result of the investigations, the following facts have been ascertained: It is general that conventional soft bushing metals can readily make its adaptation or running-in so that the surface of the bushing metals is smoothened. However, in case that the hard sliding surface of the shaft is machined to be sufficiently smoothened so that its surface roughness is smaller than a certain special roughness, the adaptation of an opposite material is remarkably retarded, or otherwise a phenomena where no adaptation is made is observed. From the above, the above phenomena that the friction torque is not lowered results from the fact that sliding is made in a condition where the surface roughness of the bushing is maintained large.

On the basis of the above evaluation results, a tendency of the frictional torque relative to a root mean square composite roughness for the shaft and the bushing has been investigated. As a result of this investigation, it has been ascertained that the frictional torque tends to lower as the composite roughness for the both sliding surfaces of the shaft and the bushing decreases, as shown in FIG. 2 in which the relationship between the composite roughness and the friction torque measured is shown. The composite roughness is represented by $$Rq = \sqrt{(Rq(s))^2 + Rq(b)^2} \quad \text{[Math. 1]}$$

where Rq(s) and Rq(b) indicate respectively the surface roughness of the shaft and the surface roughness of the bushing. In the measurement, the shaft is rotated at 2000 r.p.m. and at 600 r.p.m. Thus, it has been ascertained that under a condition where the surface roughness of the shaft is very small, the surface roughness of the shaft having a relatively large surface roughness highly affects the friction torque in the whole system of the sliding device including the sliding bushing. Therefore, smoothening only the surface of the relatively hard shaft is not suitable as a measure of lowering the sliding resistance.

In view of the above, the present inventors have found such a peculiar phenomena that a friction torque increases if the surface roughness of the shaft is decreased below a certain value, as a result of experiments in which the friction torque is measured upon changing the surface roughness to decrease in order to lower the sliding resistance of the sliding device.

Furthermore, it has become apparent that the surface roughness (arithmetical means roughness) Ra of the shaft that causes such a peculiar phenomena is not larger than 0.05 micrometer. With such a surface roughness, it is nearly common that the adaptation or running-in of the softer bushing (opposite member) cannot progress without exception, so that the surface roughness of the bushing is kept at its initial state.

On the basis of such knowledge, it is confirmed that the sliding resistance of the sliding device including the sliding bushing can be sharply lowered by setting the surface roughness of the shaft and the sliding bushing in conformity with the hardness of the shaft and the hardness of the sliding bushing. This leads to the principle of the present invention.

Therefore, it is an object of the present invention to provide an improved sliding device which can effectively overcome the above-discussed drawbacks encountered in conventional techniques.

Another object of the present invention is to provide an improved sliding device in which a shaft is in slidable contact with a sliding bushing in the presence of a lubricant, the sliding device including a special combination of a sliding surface of the shaft and a sliding surface of the bushing, thereby exhibiting a sliding resistance lowering effect in conformity with a surface roughness of the sliding surface of the shaft which is harder than the sliding surface of the bushing, even in case that the surface roughness of the sliding surface of the shaft is very small.

According to the present invention, a sliding device comprises a sliding bearing (or a sliding bushing), and a shaft which is rotatable and in slidable contact with the sliding bearing in presence of a lubricating oil. The sliding bearing has a surface hardness smaller than a surface hardness of the shaft.

Additionally, the sliding bearing has a surface roughness Ra of not larger than 0.2 micrometer, and the shaft has a surface roughness of not larger than 0.05 micrometer.

BEST MODE FOR CARRYING OUT THE INVENTION

Figure 4:
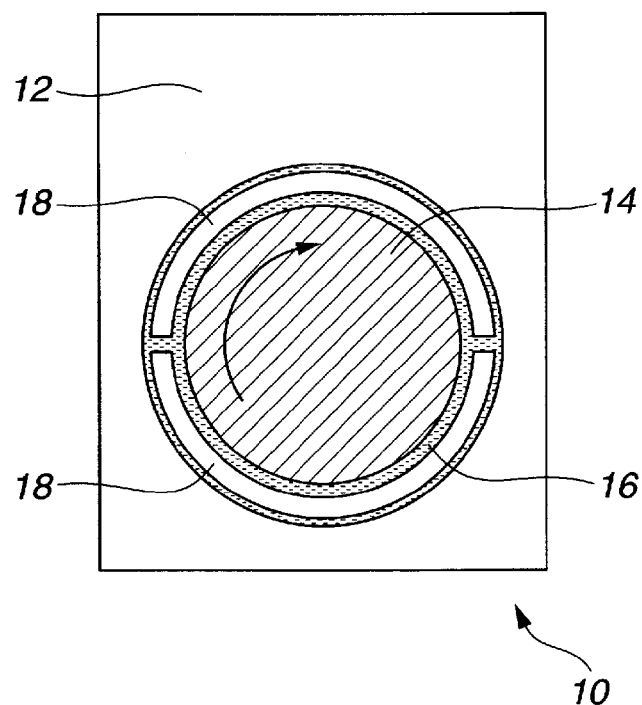
FIG. 4 is a schematic sectional view of an embodiment of a sliding device according to the present invention.

According to the present invention, a sliding device 10 comprises a sliding bearing (or sliding bushing) 12, and a shaft 14 which is rotatable and in slidable contact with the sliding bearing in presence of a lubricating oil 16, as shown in FIG. 4. The sliding bearing has a surface hardness smaller than a surface hardness of the shaft. The sliding bearing has a surface roughness (arithmetical means roughness) Ra of not larger than 0.2 micrometer, and the shaft has a surface roughness of not larger than 0.05 micrometer. The arithmetical mean roughness is according to JIS (Japanese Industrial Standard) B 0601 or ISO 4287.

Preferably, the bearing 12 includes a bearing metal (or bushing metal) 18 in slidable contact with the shaft in presence of the lubricating oil 16, as shown in FIG. 4. The bushing metal has a surface roughness Ra smaller than 0.1 micrometer.

Additionally, according to another embodiment, the bushing metal is formed at its surface with fine depressions such as grooves or pockets (pits) for retaining the lubricating oil, leaving a flat surface section which is slidable contact with the shaft. The flat surface section has a surface roughness Ra of not larger than 0.2 micrometer.

Further, according to another embodiment, the shaft is formed of cast iron or carbon steel.

Furthermore, the shaft is preferably formed at its surface with fine depressions such as grooves or pockets (pits) for retaining the lubricating oil. Under a condition where an excessive load is applied to the sliding bearing or in case that the supply amount of lubricating oil temporarily decreases during sliding of the sliding bearing, a friction reduction effect can be further increased while avoiding the risk of seizure.

Moreover, a carbon thin film having a hydrogen content of preferably less than 4.5 atomic % (more preferably not more than 1 atomic %) is formed on a surface of at least one of the sliding bearing and the shaft. In case of low hydrogen content, the above effect of the fine pits formed at the surface of the shaft cannot be impeded and can be rather increased.

The principle of the present invention may be preferably applied to a sliding device including a main journal bushing of a reciprocating internal combustion engine, a bearing of a connecting rod, a bearing for a piston pin, or a bearing for a journal of a camshaft, thereby exhibiting a particularly high advantageous effect.

EXAMPLES

The present invention will be more readily understood with reference to the following Examples in comparison with Comparative Examples; however, these Examples are intended to illustrate the invention and are not to be construed to limit the scope of the invention.

Comparative Example 1

An engine friction measuring test was conducted on an internal combustion engine (four-cylinder inline engine having a displacement of 2,500 cc) which used an engine oil (having a viscosity 5W-30) for a gasoline-fueled engine and was driven by an electric motor.

The engine had a crankshaft having main journals rotatably supported by main journal bushings and crank pins rotatably supported by connecting rod half-bushings. Each main journal and each crank pin had a surface roughness (arithmetical means roughness) Ra of 0.07 micrometer. Each main journal bushing had a main journal bushing metal, while each connecting rod half-bushing had a connecting rod half-bushing metal. Each main journal bushing metal and each connecting rod half-bushing metal were formed with grooves for retaining lubricating oil and were formed of an aluminum alloy. Additionally, the each main journal bushing metal and each connecting rod half-bushing metal had a surface roughness Ra of 0.24 micrometer and a surface hardness (Vickers hardness) of 95 Hv.

In the engine friction measuring test, a friction torque was measured by a torque meter. As a result of the test, the measured torque was 2.5 Nm.

Comparative Example 2

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.05 micrometer. Each main journal bushing metal and each connecting rod half-bushing metal were formed of an aluminum alloy and had a surface roughness Ra of 0.24 micrometer and a surface hardness (Vickers hardness) of 95 Hv.

In the engine friction measuring test, a friction torque was measured by a torque meter. As a result of the test, the measured torque was 2.2 Nm, exhibiting a slight torque lowering effect as compared with Comparative Example 1.

Comparative Example 3

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.04 micrometer. Each main journal bushing metal and each connecting rod half-bushing metal were formed of an aluminum alloy and had a surface roughness Ra of 0.24 micrometer and a surface hardness (Vickers hardness) of 95 Hv.

In the engine friction measuring test, a friction torque was measured by a torque meter. As a result of the test, the measured torque was 2.4 Nm which was nearly equal to the torque in Comparative Example 1 and higher than the torque in Comparative Example 2.

Comparative Example 4

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.015 micrometer. Each main journal bushing metal and each connecting rod half-bushing metal were formed of an aluminum alloy and had a surface roughness Ra of 0.24 micrometer and a surface hardness (Vickers hardness) of 95 Hv.

In the engine friction measuring test, a friction torque was measured by a torque meter. As a result of the test, the measured torque was 2.4 Nm which was equal to the torque in Comparative Example 3.

Comparative Example 5

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.07 micrometer. Each main journal bushing metal and each connecting rod half-bushing metal were formed of an aluminum alloy and had a surface roughness Ra of 0.15 micrometer and a surface hardness (Vickers hardness) of 95 Hv.

In the engine friction measuring test, a friction torque was measured by a torque meter. As a result of the test, the measured torque was 2.4 Nm which was nearly equal to the torque in Comparative Example 1.

Example 1

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.04 micrometer. Each main journal bushing metal and each connecting rod half-bushing metal were formed of an aluminum alloy and had a surface roughness Ra of 0.15 micrometer and a surface hardness (Vickers hardness) of 95 Hv.

In the engine friction measuring test, a friction torque was measured by a torque meter. As a result of the test, the measured torque was 1.9 Nm, exhibiting a friction torque lowering effect owing to decreasing the surface roughness of the journals of the crankshaft, as compared with Comparative Example 3.

Example 2

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.015 micrometer. Each main journal bushing metal and each connecting rod half-bushing metal were formed of an aluminum alloy and had a surface roughness Ra of 0.15 micrometer and a surface hardness (Vickers hardness) of 95 Hv.

In the engine friction measuring test, a friction torque was measured by a torque meter. As a result of the test, the measured torque was 1.6 Nm, exhibiting a further friction torque lowering effect as compared with Example 1 and a large friction torque lowering effect over Comparative Example 4.

Example 3

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.015 micrometer. Each main journal bushing metal and each connecting rod half-bushing metal were formed of a lead alloy and had a surface roughness Ra of 0.07 micrometer and a surface hardness (Vickers hardness) of 40 Hv.

In the engine friction measuring test, a friction torque was measured by a torque meter. As a result of the test, the measured torque was 1.3 Nm, exhibiting a further friction torque lowering effect as compared with Example 2.

Example 4

An engine friction measuring test as same as in Comparative Example 1 was conducted on the same internal combustion engine as in Comparative Example 1 using the same engine oil as in Comparative Example 1. In the engine, each main journal or each crank pin had a surface roughness (arithmetical means roughness) Ra of 0.015 micrometer. Each main journal bushing metal and each connecting rod half-bushing metal were formed of a bismuth alloy and had a surface roughness Ra of 0.07 micrometer and a surface hardness (Vickers hardness) of 45 Hv.

In the engine friction measuring test, a friction torque was measured by a torque meter. As a result of the test, the measured torque was 1.3 Nm, exhibiting the same friction torque lowering effect as Example 3.

Example 5

An engine friction measuring test as same as in Comparative Example 1 was conducted on the same internal combustion engine as in Comparative Example 1 using the same engine oil as in Comparative Example 1. In the engine, each main journal and each crank pin were formed at its surface with pits each of which had an average depth of 10 micrometers, an average width of 100 micrometers and an average length of 300 micrometers. The total surface areas of the pits occupy 5% of the whole surface area of each main journal or each crank pin. Each main journal and each crank pin had a surface roughness (arithmetical means roughness) Ra of 0.015 micrometer. Each main journal bushing metal and each connecting rod half-bushing metal were formed of an aluminum alloy and had a surface roughness Ra of 0.07 micrometer and a surface hardness (Vickers hardness) of 95 Hv.

In the engine friction measuring test, a friction torque was measured by a torque meter. As a result of the test, the measured torque was 1.0 Nm, exhibiting a further friction torque lowering effect as compared with Example 4. Additionally, a time duration for causing seizure upon stopping supply of the lubricating oil was measured for the engine of this Example and of Comparative Example 4, in which 420 seconds were required to cause the seizure in the engine of this Example while 28 seconds were required to cause the seizure in the engine of Comparative Example 4.

Example 6

An engine friction measuring test as same as in Comparative Example 1 was conducted on the same internal combustion engine as in Comparative Example 1 using the same engine oil as in Comparative Example 1. In the engine, each main journal and each crank pin had a surface roughness (arithmetical means roughness) Ra of 0.015 micrometer. A hard carbon (diamond-like carbon) thin film having a thickness of 1 m and a hydrogen content of not more than 0.1 atomic % was formed on each main journal and each crank pin by an arc ion plating process. Each main journal bushing metal and each connecting rod half-bushing metal were formed of an aluminum alloy and had a surface roughness Ra of 0.07 micrometer and a surface hardness (Vickers hardness) of 95 Hv.

In the engine friction measuring test, a friction torque was measured by a torque meter. As a result of the test, the measured torque was 0.8 Nm, exhibiting a large friction torque lowering effect as compared with Example 4.

Figure 1:
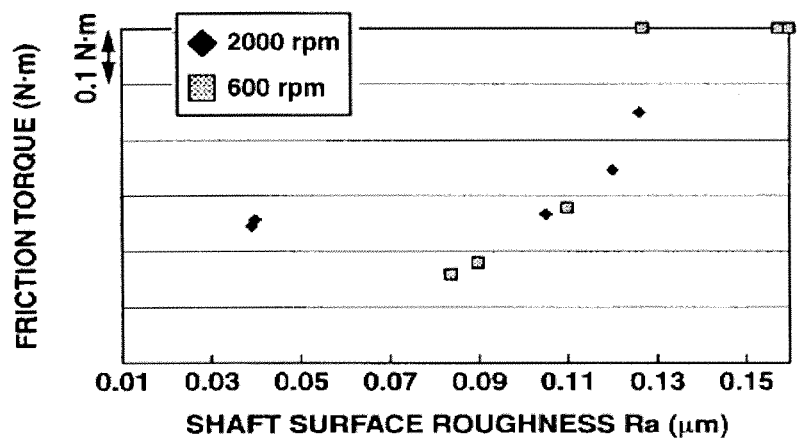
FIG. 1 is a graph showing the relationship between the surface roughness of a shaft and the measured friction torque, obtained upon investigation conducted by the present inventors in connection with the present invention.
Figure 2:
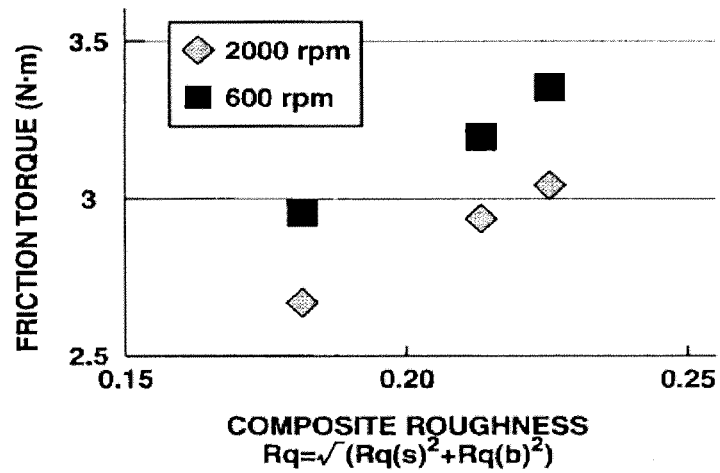
FIG. 2 is a graph showing the relationship between the composite roughness for a shaft and a sliding bearing and the measured friction torque, obtained upon investigation of the present inventors in connection with the present invention.
Figure 3:
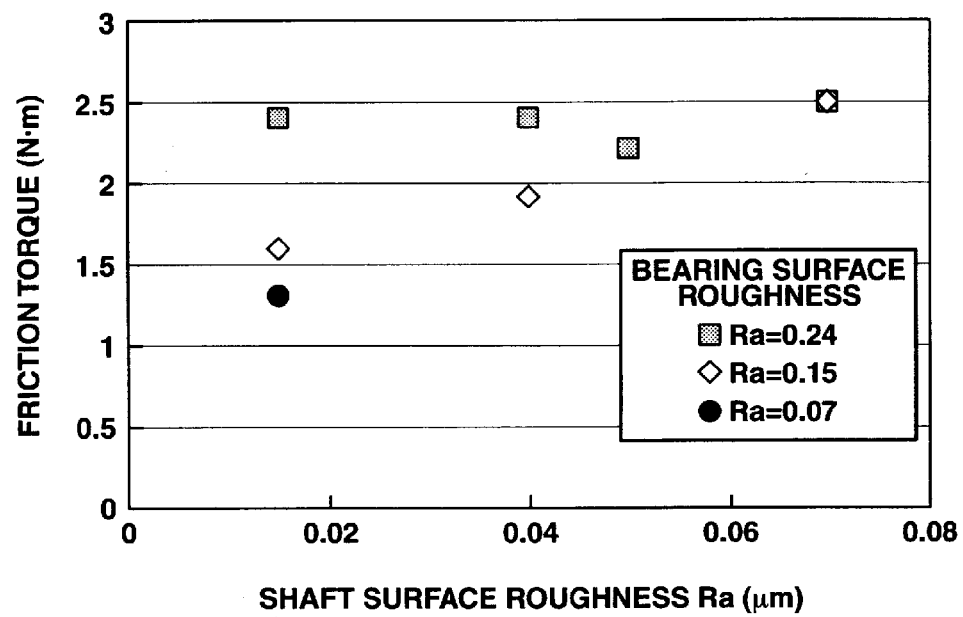
FIG. 3 is a graph showing the relationship between the measured friction torque and the combination of the surface roughness of a shaft and the surface roughness of a bearing.

Structural specifications of the shaft and the bearing and experimental results of Comparative Examples 1 to 5 and Examples 1 to 6 are shown in Table 1. Additionally, the relationship between the measured friction torque and the combination of the surface roughness of the shaft and the surface roughness of the bearing is shown in FIG. 3, in connection with Comparative Examples 1 to 5 and Examples 1 to 3.

TABLE 1

| | Surface roughness of crankshaft journal and crank pin (μm) | Surface roughness of bushing metal (μm) | Material and specification of crankshaft journal and crank pin | Friction torque (Nm) |
|---|---|---|---|---|
| Comparative example 1 | 0.07 | 0.24 | Carbon steel | 2.5 |
| Comparative example 2 | 0.05 | 0.24 | Carbon steel | 2.2 |
| Comparative example 3 | 0.04 | 0.24 | Carbon steel | 2.4 |
| Comparative example 4 | 0.015 | 0.24 | Carbon steel | 2.4 |
| Comparative example 5 | 0.07 | 0.15 | Carbon steel | 2.4 |
| Example 1 | 0.04 | 0.15 | Carbon steel | 1.9 |
| Example 2 | 0.015 | 0.15 | Carbon steel | 1.6 |
| Example 3 | 0.015 | 0.07 | Carbon steel | 1.3 |
| Example 4 | 0.015 | 0.07 | Carbon steel | 1.3 |
| Example 5 | 0.015 | 0.07 | Carbon steel plus fine pits formed at surface | 1.0 |
| Example 6 | 0.015 | 0.07 | Carbon steel plus DLC film formed at surface | 0.8 |

Although the invention has been described above by reference to certain embodiments and examples of the invention, the invention is not limited to the embodiments and examples described above. Modifications and variations of the embodiments and examples described above will occur to those skilled in the art, in light of the above teachings. The scope of the invention is defined with reference to the following claims.

The invention claimed is:

1. A sliding device comprising:
a sliding bearing having a bushing member; and
a shaft which is rotatable relative to the bushing member of the sliding bearing, the shaft having a metal surface in slidable contact with a metal surface of the bushing member of the sliding bearing in the presence of a lubricating oil,
wherein the metal surface of the bushing member of the sliding bearing has a surface hardness smaller than a surface hardness of the metal surface of the shaft, and
wherein the metal surface of the bushing member of the sliding bearing has a surface roughness Ra of 0.07 to 0.2 micrometer, and the metal surface of the shaft has a surface roughness Ra of not larger than 0.05 micrometer.

2. A sliding device as claimed in claim 1, wherein the metal surface of the bushing member has a surface roughness Ra of 0.07 to 0.1 micrometer.

3. A sliding device as claimed in claim 1, wherein the metal surface of the bushing member is formed with fine depressions, leaving a flat surface section in slidable contact with the metal surface of the shaft, the flat surface section having a surface roughness Ra of 0.07 to 0.2 micrometer.

4. A sliding device as claimed in claim 1, wherein the shaft is formed of one of cast iron and carbon steel.

5. A sliding device as claimed in claim 1, wherein the shaft is formed at its surface with fine depressions for retaining lubricating oil.

6. A sliding device as claimed in claim 1, wherein the sliding bearing is made of an aluminum alloy in a form selected from the group consisting of a main journal bushing of a reciprocating engine, a bearing of a crank pin, a bearing for a piston pin, and a bearing for a journal of a camshaft.

7. A sliding device as claimed in claim 1, wherein the bushing member is a bearing metal with finishing directly on a surface thereof.

8. A sliding device as claimed in claim 1, wherein the sliding device is applied on a moto-propulsor group.

9. A sliding device as claimed in claim 1, wherein the surface roughness Ra of the metal surface of the bushing member of the sliding bearing is 0.07 to 0.15 micrometer.

10. The sliding device as claimed in claim 1, wherein the metal surface of the bushing member has a surface hardness between 40-95 Hv and which is smaller than a surface hardness of the metal surface of the shaft.

11. The sliding device as claimed in claim 1, wherein the bushing member comprises two semicircular half-bushings that are symmetrically opposed to each other.

12. The sliding device as claimed in claim 1, wherein the surface roughness Ra of the metal surface of the bushing member is 0.15 to 0.2 micrometer.

13. The sliding device as claimed in claim 1, wherein the metal surface of the bushing member has a surface hardness between 40-45 Hv and which is smaller than a surface hardness of the metal surface of the shaft.

14. The sliding device as claimed in claim 1, wherein the metal surface of the shaft has a surface roughness Ra of between 0.015 and 0.05 micrometer.

15. A sliding device comprising:
   a sliding bearing having a bushing member; and
   a shaft which is rotatable relative to the bushing member of the sliding bearing, the shaft having an uncoated surface in slidable contact with an uncoated surface of the bushing member of the sliding bearing in the presence of a lubricating oil,
   wherein the uncoated surface of the bushing member of the sliding bearing has a surface hardness smaller than a surface hardness of the uncoated surface of the shaft,
   wherein the uncoated surface of the bushing member of the sliding bearing has a surface roughness Ra of 0.07 to 0.2 micrometer, and the uncoated surface of the shaft has a surface roughness Ra of not larger than 0.05 micrometer.

16. A sliding device as claimed in claim 15, wherein the shaft comprises one of uncoated cast iron and uncoated carbon steel.

17. A sliding device as claimed in claim 16, wherein the shaft consists of one of uncoated cast iron and uncoated carbon steel.

18. A sliding device as claimed in claim 15, wherein the sliding bearing consists of an uncoated aluminum alloy in a form selected from the group consisting of a main journal bushing of a reciprocating engine, a bearing of a crank pin, a bearing for a piston pin, and a bearing for a journal of a camshaft.

19. The sliding device as claimed in claim 15, wherein the uncoated surface of the bushing member has a surface hardness between 40-45 Hv and which is smaller than a surface hardness of the uncoated surface of the shaft.

20. The sliding device as claimed in claim 15, wherein the uncoated surface of the shaft has a surface roughness Ra of between 0.015 and 0.05 micrometer.

* * * * *